United States Patent [19]

Geer et al.

[11] Patent Number: 4,610,466
[45] Date of Patent: Sep. 9, 1986

[54] CONVERTIBLE FLARE/BRAZE FITTING

[75] Inventors: Linda L. Geer, Jackson; Steven M. Knowles, Cement City, both of Mich.

[73] Assignee: Aeroquip Corporation, Jackson, Mich.

[21] Appl. No.: 761,663

[22] Filed: Aug. 1, 1985

Related U.S. Application Data

[63] Continuation of Ser. No. 507,038, Jun. 23, 1983, abandoned.

[51] Int. Cl.⁴ ............................................. F16L 25/00
[52] U.S. Cl. ................................. 285/12; 285/334.5; 285/328; 285/329; 285/378; 285/173
[58] Field of Search ................. 285/12, 334.5, 328, 285/329, 354, 378, 173

[56] References Cited

U.S. PATENT DOCUMENTS

| | | | |
|---|---|---|---|
| 911,123 | 2/1909 | Fuller | 285/12 |
| 1,820,020 | 8/1931 | Hewitt | 285/12 |
| 1,834,581 | 12/1931 | Ferrell et al. | 285/328 |
| 2,159,811 | 5/1939 | Leonardo | 285/115 |
| 2,258,066 | 10/1941 | Oyen | 285/328 |
| 2,289,382 | 7/1942 | Parker | 285/334.5 |
| 2,310,944 | 2/1943 | Douglass | 285/329 |
| 2,399,275 | 4/1946 | Wenk | 285/86 |
| 2,489,928 | 11/1949 | Phillips | 285/86 |
| 2,517,617 | 8/1950 | Woodling | 285/334.5 |
| 2,824,756 | 2/1958 | Wagner | 285/12 |
| 3,126,212 | 3/1964 | Young | 285/12 |
| 3,200,366 | 8/1965 | Stuart | 285/328 |

FOREIGN PATENT DOCUMENTS

| | | | |
|---|---|---|---|
| 0503084 | 7/1930 | Fed. Rep. of Germany | 285/354 |
| 3147050 | 6/1983 | Fed. Rep. of Germany | 285/354 |
| 0686275 | 1/1953 | United Kingdom | 285/334.5 |
| 2007791 | 5/1979 | United Kingdom | 285/12 |
| 2018926 | 10/1979 | United Kingdom | 285/334.5 |

Primary Examiner—Cornelius J. Husar
Assistant Examiner—Eric K. Nicholson
Attorney, Agent, or Firm—Beaman & Beaman

[57] ABSTRACT

A convertible fitting capable of selectively achieving a brazed, soldered or flared connection to a conduit. The fitting includes an interior passage and an exterior thread. The passage receives smooth wall conduit, such as tubing, for a braze or soldered connection, and an insert receivable within the fitting includes a conduit flare engaging surface and a seal cooperable with the fitting wherein the tightening of a conventional flare nut simultaneously seals the conduit flare to the insert and the insert to the fitting.

2 Claims, 5 Drawing Figures

CONVERTIBLE FLARE/BRAZE FITTING

This is a continuation of U.S. patent application Ser. No. 507,038, filed 6/23/83 now abandoned.

BACKGROUND OF THE INVENTION

Fittings employed at the end of conduits take a variety of forms, such as adapters, tees, elbows, etc., and smooth wall conduits such as copper pipe, may be attached to the fittings by several systems, such as by brazing or soldering, flares, upset or flanged ends, compression rings, or the like. Each type of interconnection between the conduit and fitting requires a particular fitting configuration, and with some modes of connection, the conduit end must be worked, such as flared or upset. Except for the brazed or soldered connections, a rotatable nut is usually mounted upon the conduit for attachment to fitting threads.

In view of the variety of connection systems available suppliers of OEM equipment such as refrigeration units, air conditioners, and the like, must decide which type of fitting to employ without knowing the type of conduit connections preferred by their customers, or which will be used with the equipment being sold. Thus, it is often necessary for distributors, dealers, installers, etc. to maintain a large inventory of various types of fittings to accommodate the particular installation desired. While convertible or multi-purpose conduit fitting connections are known, such known fittings are too costly, or complicated, to enjoy commercial success, or do not lend themselves to diverse installation. The following United States patents illustrate convertible or multi-purpose fittings previously proposed but not commercially available: U.S. Pat. Nos. 1,820,020; 2,159,811; 2,824,756; 2,489,928 and 3,126,212.

It is an object of the invention to provide a convertible fitting usable with conduit or tubing to selectively produce either a brazed, soldered or flared connection thereby substantially reducing inventory requirements.

Another object of the invention is to provide a fitting for conduit or tube wherein either a brazed, soldered or flared connection may be used, and when utilizing a flared connection an inexpensive insert is employed, the insert construction being such that tightening of the flare nut simultaneously seals the conduit flare to the insert and seals the insert to the fitting with a metal-to-metal seal.

In the practice of the invention the fitting includes an internal passage which is provided with a concentric counterbore intersecting an end surface. Externally, the fitting is provided with threads concentric to the passage adjacent the fitting end. The cylindrical counterbore permits the end of a cylindrical conduit or tube, such as copper tube, or the like, to be inserted thereinto, and connected to the fitting by conventional brazing or soldering techniques.

If a flare is formed upon the end of the conduit, an annular insert is located within the fitting counterbore and the insert includes a head having a conventional conical surface for cooperation with the conduit flare. The insert head is also provided with a homogeneous ridge in axial alignment with the fitting end, the ridge having a sharpened apex wherein tightening of a standard flare nut upon the fitting threads forces the conduit flare upon the insert conical surface, and simultaneously axially displaces the insert into the fitting counterbore to slightly embed the insert ridge into the fitting end producing a fluid tight metal-to-metal seal between the insert and fitting, as well as produce a fluid tight seal between the insert and flare.

The manufacture of fittings in accord with the invention requires no unusual machining techniques, may be economically achieved, and the insert is also a low cost high production part which may be economically discarded if a flare connection is not desired.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
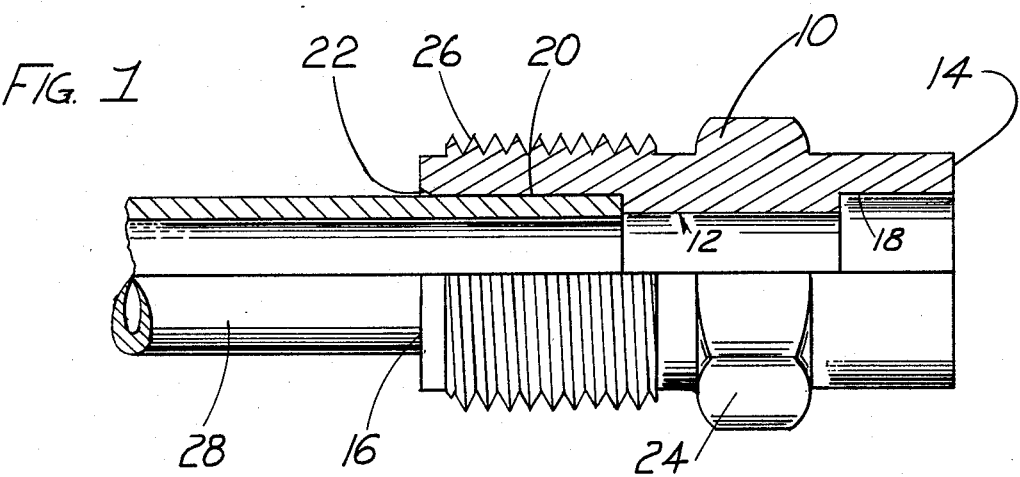
FIG. 1 is an elevational view, partially sectioned, illustrating a fitting in accord with the invention utilizing a brazed or soldered connection to a conduit.
Figure 2:
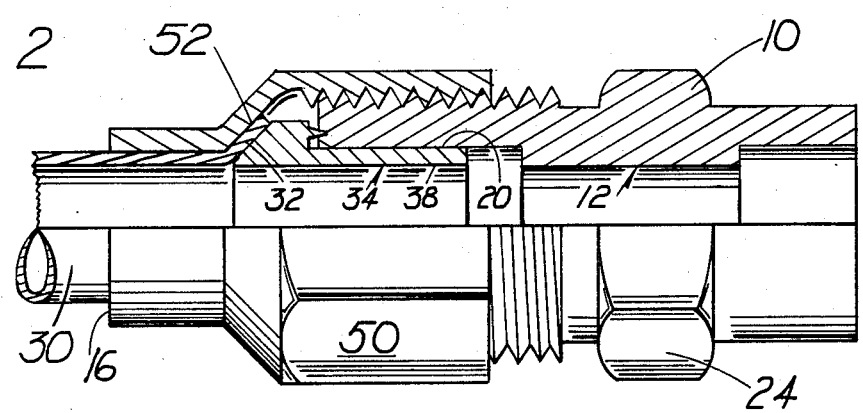
FIG. 2 is an elevational view, partially sectioned, of a fitting in accord with the invention as connected to a flared conduit, illustrating the insert in the operative sealed relationship to the fitting.

The configuration of the fitting in accord with the invention is apparent from FIGS. 1 and 2. The fitting includes a metal body 10, often formed of copper or brass, and includes an axial passage 12 intersecting the ends 14 and 16. The passage includes a concentric cylindrical counterbore 18 intersecting end 14 to which a conduit, not shown, may be brazed or soldered, as known, and the passage also includes the concentric cylindrical counterbore or recess 20 intersecting end 16. A beveled surface may be defined at 22 intersecting end 16 and counterbore 20 to aid in the insertion of a conduit into the counterbore, and to facilitate the brazing or soldering operation, if used. The fitting body 10 also includes the usual wrench engaging flats 24, and is externally threaded at 26.

If the fitting body is to be connected to a conduit 28 by brazing or soldering, the counterbore 20 and the end of the conduit are prepared in the usual manner by cleaning and fluxing, and the conduit is inserted into the counterbore and soldered or brazed therein in the known manner.

Figure 3:
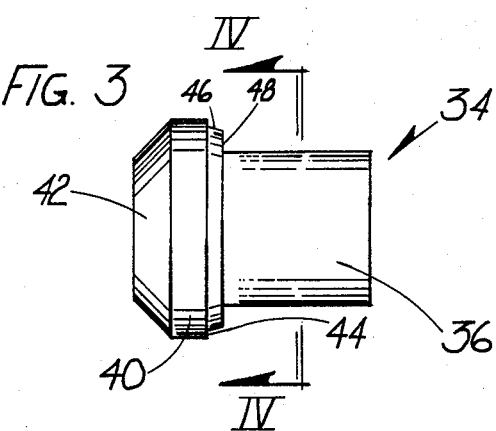
FIG. 3 is a side elevational view of the insert, per se.
Figure 4:
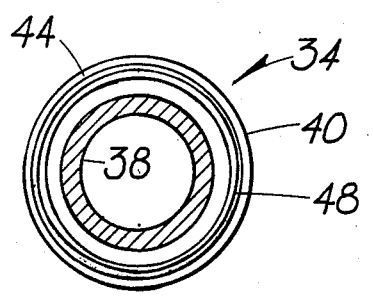
FIG. 4 is a elevational, sectional view taken through the insert along Section IV—IV of FIG. 3.
Figure 5:
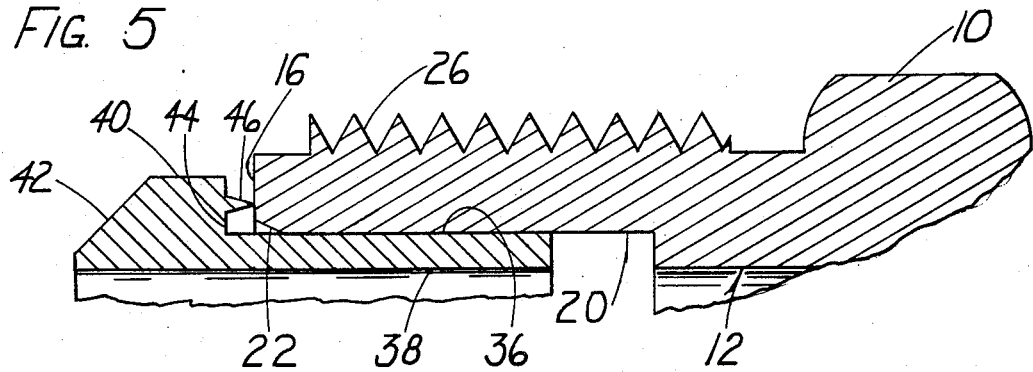
FIG. 5 is an enlarged, sectional, detail view of the fitting counterbore and insert prior to the insert being embedded therein.

If it is desired to connect a flared conduit, such as shown at 30 in FIG. 2 having a conical flare 32 to the fitting body 10, the insert 34, FIG. 3, is used in conjunction with the fitting. The insert 34 is of a generally cylindrical configuration having an external cylindrical surface at 36, and is provided with a cylindrical bore 38. An enlarged diameter head 40 is defined upon the insert and the head includes a standard conical surface 42 of 45° for cooperation with a conventional conduit flare. Also, the head 40 includes a radial shoulder 44 lying in a plane perpendicular to the axis of the insert, and this shoulder includes an annular axially extending ridge or projection 46 having a sharp apex 48. The diameter of the insert 34 is slightly less than the diameter of the fitting counterbore 20 wherein the surfaces readily telescope as apparent in FIGS. 2 and 5 for assembly of the insert into the counterbore in the illustrated manner.

After inserting the insert into the counterbore 20 the conduit flare 32 is brought into engagement with the insert surface 42, and the flare nut 50 rotatably mounted upon the conduit or tube 30 in the known manner is rotated to thread the nut upon the fitting threads 26. As the nut is threaded upon the fitting the conical nut surface 52 engages the flare 32 forcing the flare into firm engagement with the insert surface 42. As the nut 50 is further threaded upon the fitting the flare will force the ridge 46 against the fitting end 16, and final tightening of the nut will embed the ridge apex 48 slightly into the fitting end 16. Thus, a fluid tight metal-to-metal seal is achieved between the fitting body 10 and insert 34 by the ridge 46, and simultaneously a fluid tight metal-to-metal engagement will exist between the insert and the conduit flare 32.

The construction of the insert 34 permits the nut 50 to be unloosened and removed from the fitting and the reassembly of the conduit 30 upon the insert may occur a number of times without affecting the efficiency of the sealed relationship.

The fitting body 10 and the insert 34 may be formed of the same material or the material of the insert may be slightly harder than the fitting body material.

As the insert 34 is easily manufactured on automatic turning machines the cost of producing the insert is small, permitting the insert to be provided with each fitting body regardless of whether a brazed or soldered connection, or flared connection, is to be used. The fitting of the invention reduces inventories due to its multi-mode use, and it is appreciated that various modifications to the inventive concepts may be apparent to those skilled in the art without departing from the spirit and scope of the invention.

We claim:

1. In combination, a fitting comprising a body having a cylindrical passage, a passage axis, a flat planar end intersected by said passage perpendicular thereto, and threads defined upon the body adjacent said end and coaxial with said passage, a cylindrical counterbore defined in said body concentric to said passage and forming a portion thereof, said counterbore directly intersecting said body end and comprising an inner cylindrical surface of uniform diameter throughout its length, a tubular insert within said counterbore having an external cylindrical surface of a diameter slightly less than the diameter of said counterbore inner surface whereby said insert is axially displaceable within said counterbore, said insert including a radially extending flange substantially perpendicularly disposed to said body passage axis located adjacent said body end exteriorly of said counterbore and having a periphery having a diameter greater than the diameter of said insert cylindrical surface and less than the minimum diameter of said threads, an outer conical sealing surface defined on said insert flange converging toward said passage axis in a direction away from said body end adapted to be engaged by a conduit flare, said flange outer conical sealing surface intersecting said flange periphery, an inner annular radial shoulder defined on said flange in axial opposed relation to said body end, an annular ridge homogeneously defined upon said inner flange shoulder concentric to said insert cylindrical surface and radially spaced outwardly therefrom radially located between said insert external cylindrical surface and said flange periphery, said ridge having a sharp apex to facilitate embedding of said ridge into said body end, and an annular nut threaded upon said body threads adapted to circumscribe the flared end of a conduit located upon said conical sealing surface and axially displace said insert into said counterbore to embed said ridge apex into said body end.

2. In a combination as in claim 1, said insert and ridge being of a harder material than the material of said body.

* * * * *